US010356983B2

(12) United States Patent
Simmons et al.

(10) Patent No.: US 10,356,983 B2
(45) Date of Patent: Jul. 23, 2019

(54) INDEXING NET WRAP SYSTEM

(71) Applicant: CNH Industrial America LLC, New Holland, PA (US)

(72) Inventors: Scott C. Simmons, Lititz, PA (US); Buweneke Fernando, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 1072 days.

(21) Appl. No.: 14/687,271

(22) Filed: Apr. 15, 2015

(65) Prior Publication Data

US 2015/0296715 A1 Oct. 22, 2015

Related U.S. Application Data

(60) Provisional application No. 61/981,706, filed on Apr. 18, 2014, provisional application No. 61/981,698, filed on Apr. 18, 2014.

(51) Int. Cl.
*A01F 15/07* (2006.01)
*B65B 41/16* (2006.01)
*B65H 16/02* (2006.01)
*B65B 41/12* (2006.01)

(52) U.S. Cl.
CPC ........ *A01F 15/0715* (2013.01); *A01F 15/071* (2013.01); *A01F 2015/072* (2013.01); *A01F 2015/0725* (2013.01); *B65B 41/12* (2013.01); *B65B 41/16* (2013.01); *B65H 16/021* (2013.01); *B65H 16/023* (2013.01); *B65H 2301/41* (2013.01); *B65H 2301/412* (2013.01); *B65H 2301/415* (2013.01); *B65H 2301/4128* (2013.01); *B65H 2301/41501* (2013.01)

(58) Field of Classification Search
CPC ................ A01F 15/0715; A01F 15/071; A01F 2015/072; A01F 2015/0725; B65H 2301/41; B65H 2301/412; B65H 2301/4128; B65H 2301/415; B65H 2301/41501
USPC ........ 53/587, 389.1, 389.2, 389.4, 582, 341, 53/118, 168
See application file for complete search history.

(56) References Cited

U.S. PATENT DOCUMENTS

| 2,195,141 | A | * | 3/1940 | Wood | B65H 16/021 242/559.2 |
| 3,204,887 | A | * | 9/1965 | Hansen | B65B 41/12 242/559.2 |
| 4,492,138 | A | * | 1/1985 | Breuers | B65H 16/021 83/203 |

(Continued)

FOREIGN PATENT DOCUMENTS

EP 1602269 A1 12/2005

*Primary Examiner* — Hemant Desai
*Assistant Examiner* — Valentin Neacsu
(74) *Attorney, Agent, or Firm* — Patrick M. Sheldrake; Peter K. Zacharias

(57) ABSTRACT

A wrapping mechanism is described that comprises at least two material support cylinders, a mechanism support cylinder, and a first and a second support plate, which are all rotatable about a support axis. The wrapping mechanism can comprise a pair of frame plates, a drive mechanism, a brake system, a lock mechanism, at least one feed roller and a feed plate. The wrapping mechanism can be integrated into an agricultural harvester such as a baler or combine.

11 Claims, 13 Drawing Sheets

(56) References Cited

U.S. PATENT DOCUMENTS

| | | | | |
|---|---|---|---|---|
| 4,597,241 A * | 7/1986 | Clostermeyer | A01F 15/0715 | 242/595 |
| 4,677,807 A * | 7/1987 | Verhulst | A01F 15/0715 | 53/118 |
| 4,903,909 A * | 2/1990 | Suzuki | B65H 23/063 | 242/421 |
| 5,974,764 A | 11/1999 | Anstey et al. | | |
| 5,979,141 A | 11/1999 | Phillips | | |
| 6,247,291 B1 * | 6/2001 | Underhill | A01F 15/0715 | 242/598.5 |
| 6,272,816 B1 * | 8/2001 | Viaud | A01F 15/0715 | 242/441.4 |
| 6,295,797 B1 * | 10/2001 | Naaktgeboren | A01D 89/008 | 56/341 |
| 6,644,006 B1 * | 11/2003 | Merritt | A01D 69/00 | 56/11.2 |
| 6,651,408 B1 * | 11/2003 | McClure | A01F 15/0715 | 242/421.2 |
| 6,688,092 B2 * | 2/2004 | Anstey | A01D 89/008 | 56/220 |
| 6,823,646 B2 | 11/2004 | McClure et al. | | |
| 6,877,304 B1 * | 4/2005 | Smith | A01D 89/008 | 56/341 |
| 7,334,382 B2 | 2/2008 | Smith | | |
| 7,356,981 B2 | 4/2008 | McClure et al. | | |
| 7,644,559 B2 | 1/2010 | Smith | | |
| 7,716,903 B2 | 5/2010 | McClure et al. | | |
| 8,490,366 B1 * | 7/2013 | Hintz | A01F 15/0715 | 242/422.4 |
| 8,516,779 B2 | 8/2013 | Bennett et al. | | |
| 8,925,287 B2 | 1/2015 | Derscheid | | |
| 2002/0130214 A1 * | 9/2002 | Nakamura | B65H 16/06 | 242/559.2 |
| 2002/0139893 A1 * | 10/2002 | Hashimoto | B65H 16/103 | 242/564 |
| 2004/0159074 A1 * | 8/2004 | McClure | A01F 15/0715 | 53/389.2 |
| 2004/0200922 A1 * | 10/2004 | Nakamura | B65H 16/06 | 242/596.5 |
| 2007/0074488 A1 * | 4/2007 | Smith | A01F 15/0715 | 53/430 |
| 2007/0084146 A1 * | 4/2007 | McClure | A01F 15/0715 | 53/430 |
| 2010/0236427 A1 * | 9/2010 | Derscheid | A01F 15/0715 | 100/5 |
| 2012/0233962 A1 * | 9/2012 | Bennett | A01F 15/0715 | 53/203 |
| 2012/0240516 A1 * | 9/2012 | Chapon | A01F 15/0715 | 53/203 |
| 2012/0272837 A1 * | 11/2012 | Smith | A01F 15/0715 | 100/34 |
| 2013/0125518 A1 * | 5/2013 | Smith | A01F 15/0715 | 53/582 |
| 2013/0305683 A1 * | 11/2013 | Ziembicki | A01D 89/004 | 56/344 |

* cited by examiner

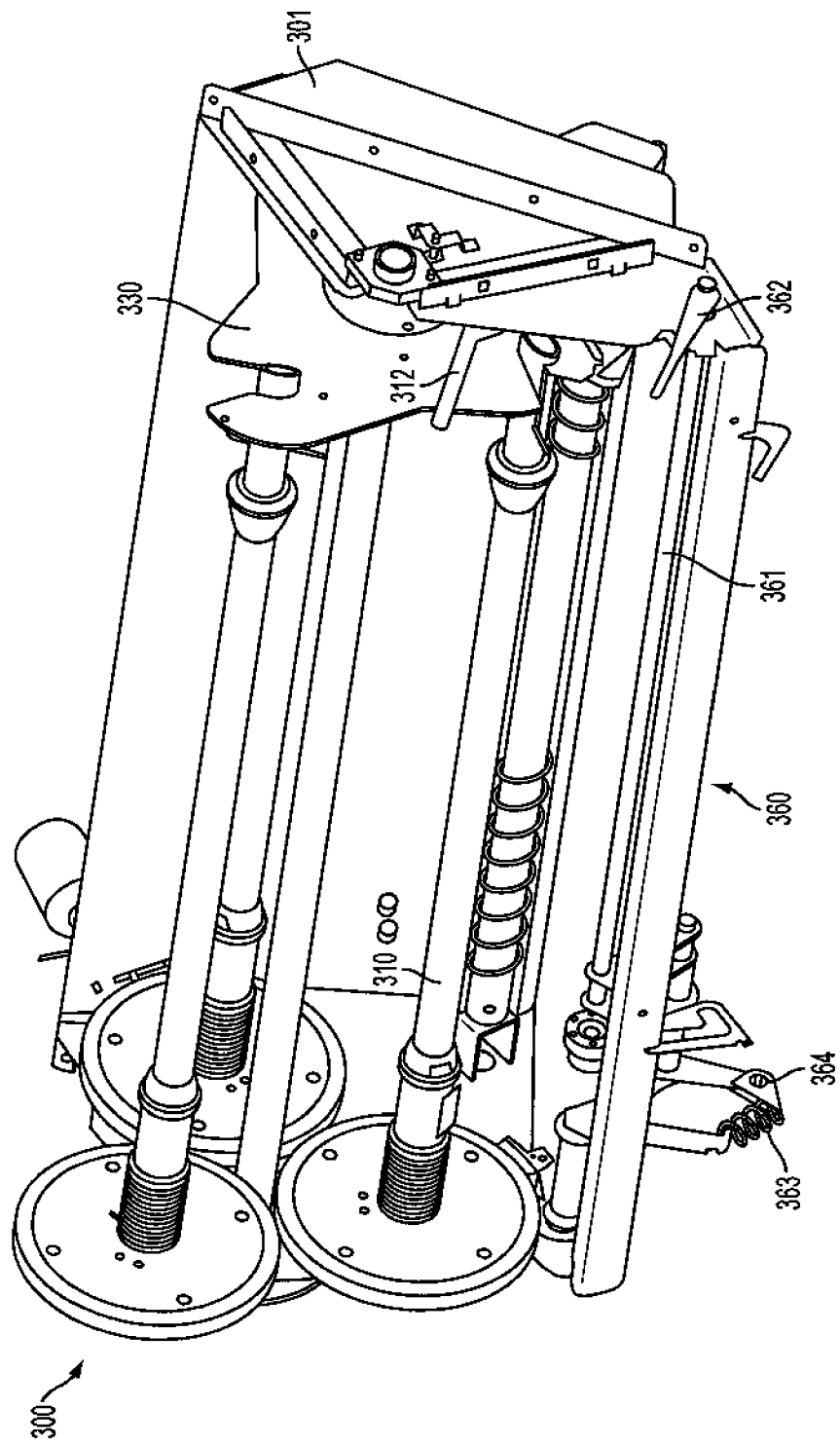

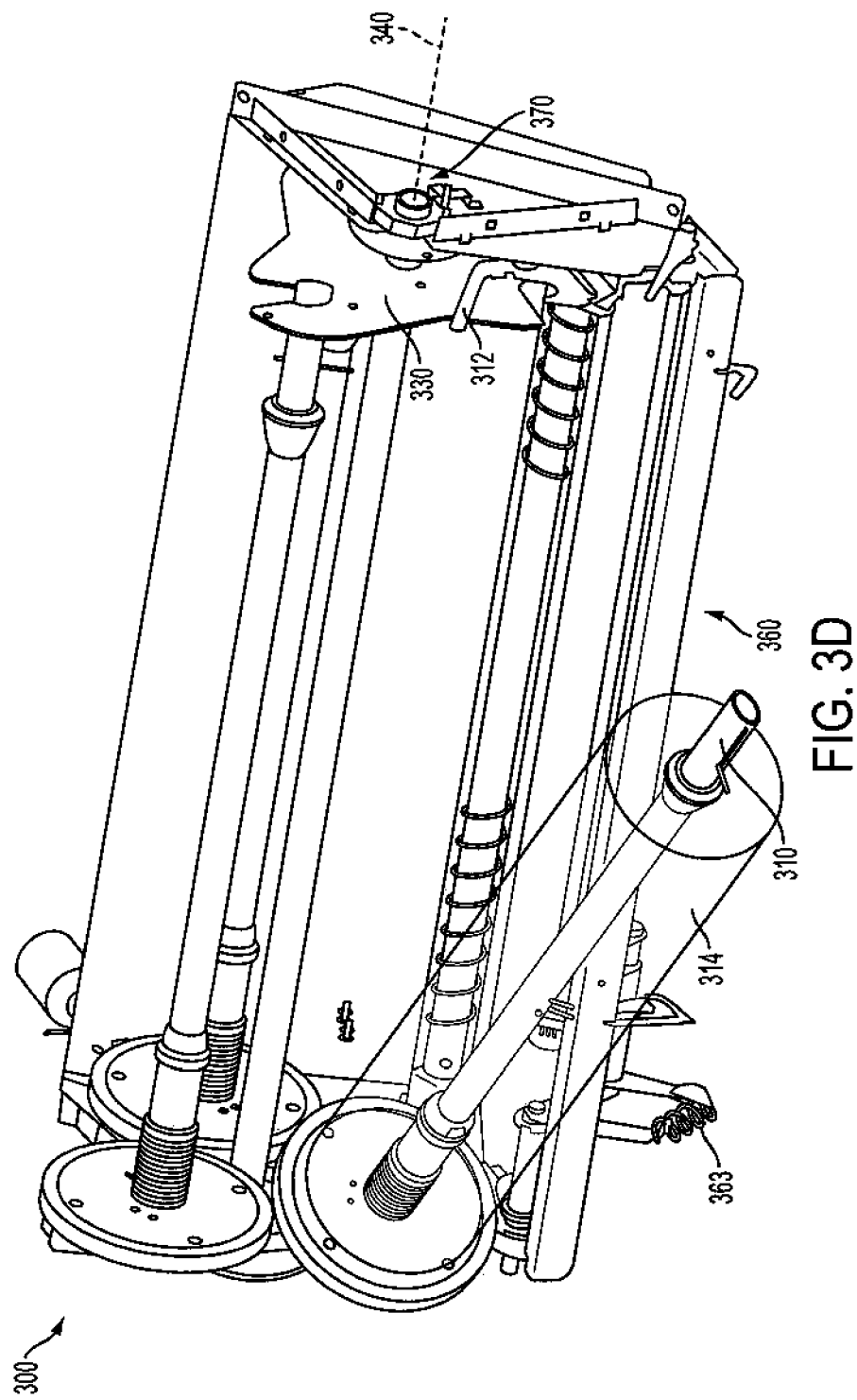

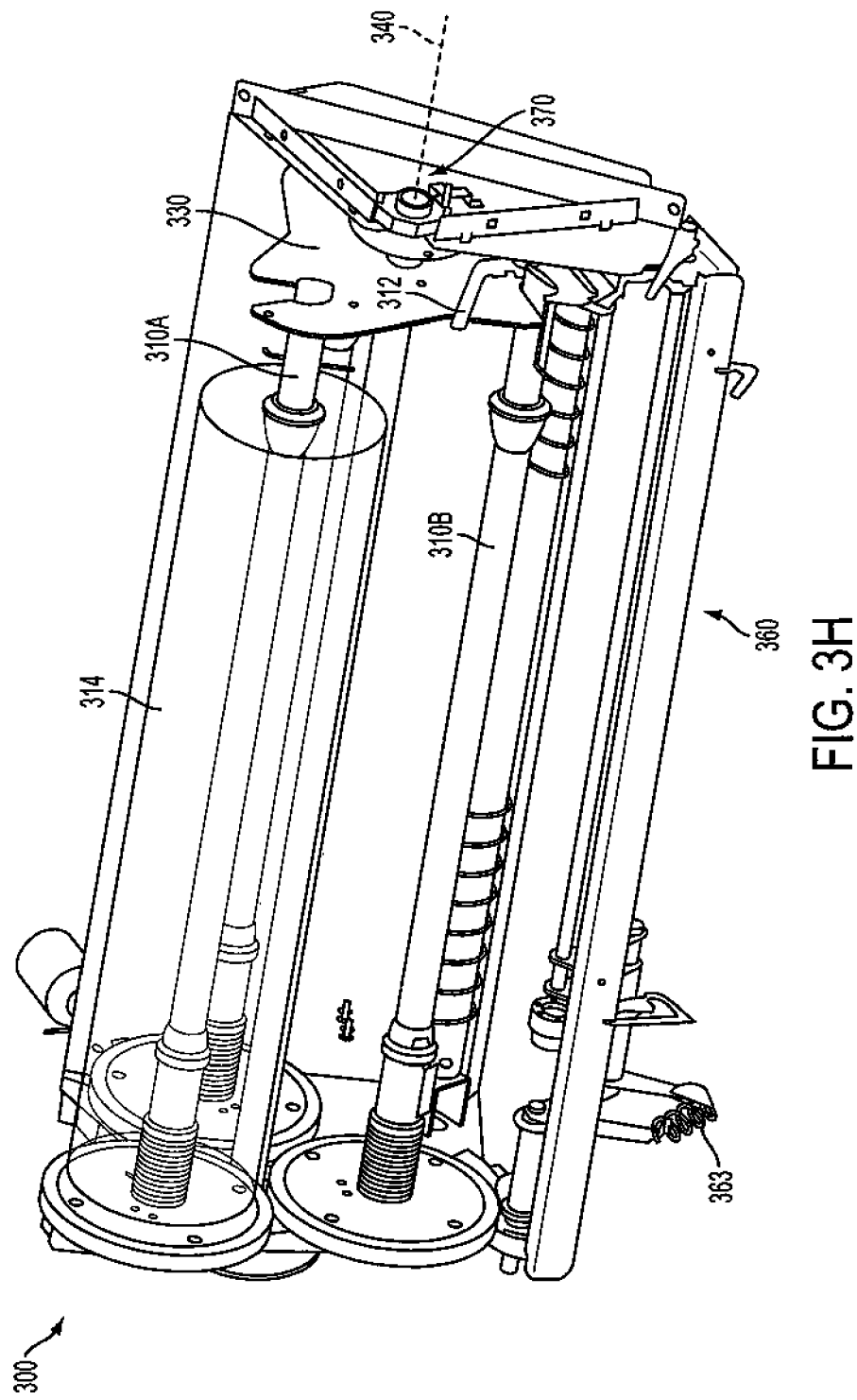

INDEXING NET WRAP SYSTEM

CROSS REFERENCE TO RELATED APPLICATIONS

This application claims the benefit of and priority to U.S. Provisional Application No. 61/981,706, filed Apr. 18, 2014, entitled INDEXING NET WRAP SYSTEM, and U.S. Provisional Application No. 61/981,698, filed Apr. 18, 2014, entitled INDEX WRAPPING SYSTEM AND SUPPORTING SYSTEMS, each of which is hereby incorporated by reference in its entirety.

TECHNOLOGY FIELD

The present disclosure relates generally to a device and physical support article for the installation and storage of wrapping material in a harvester, and particularly to multiple material support cylinders in a wrapping mechanism which hold rolls of wrapping material and revolves about a support axis in a plurality of positions.

BACKGROUND

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside, the cut crop is rolled up into a predetermined size. A conventional bale chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Wrapping material is fed into the baler off a wrapping material roll and into a wrapping mechanism, conventionally located in the front of the baler. As the baler forms, bounds, and distributes the bale, wrapping material is depleted until the roll needs to be replaced by a spare. Typically, one or two spare wrapping material rolls are stored on the baler, usually housed at the rear of the baler at the tailgate. When a roll of wrapping material needs to be replaced, the operator discards the depleted roll, walks to the back of the baler to acquire a stored roll, then walks the stored roll to the front of the baler, and installs the new roll. Wrapping material roll length typically measures 122 to 130 centimeters (48 to 51 inches) in length and between 30 and 45 kilograms (70 to 100 pounds) in weight. The size, weight, and typical location for spare roll storage create a burden for an operator to transport the roll from the rear of the baler and install the roll at the front of the baler. The operator is tasked to lift the roll to a material support cylinder and slide the roll onto the cylinder. The material support cylinder can be 4 to 5 feet off the ground. Additionally, once on the cylinder, the wrapping material roll is then pushed into the operating position. Thus, it is desirable to minimize operator effort to replace a roll of wrapping material. Relatedly, it is also desirable to improve storage capability of rolls of wrapping material on balers.

The disclosure relates to a storage location and processes for wrapping material roll indexing that minimizes manual operator effort for placement and access to wrapping material rolls in an active positions, and minimizes the time of total manual operator involvement when replacing and installing a roll of wrapping material. The disclosure improves the efficiency of the baler operation by reducing the time it takes for a baler operator to replace a roll of wrapping material.

SUMMARY

The disclosure relates to a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve; and at least one drive mechanism operably connected to at least the first support plate such that the movement of the drive mechanism drives the revolution of the at least two material support cylinders from a first position to one or more radial positions around the support axis; wherein the at least two material support cylinders are operably attached to at least the first support plate; wherein the at least two material support cylinders are configured for the support of wrapping material; and wherein at least one position of at least one material support cylinder is configured for the dispensing of wrapping material.

In some embodiments, the at least two material support cylinders comprising a first end operably connected to the first support plate by a pivoting element; and a second end operably contacted with the second support plate in at least one notch and with a lever plate positioned around the opening of the at least one notch such that the lever plate prevents pivoting motion of the material support cylinder in its first operable condition; wherein the pivoting element is configured to pivot the second end of a respective material support cylinder away from the second support plate when the lever plate moves away from the opening of the at least one notch.

In some embodiments, the wrapping mechanism also comprises: a pair of oppositely facing frame plates, a brake system, a lock mechanism, at least one feed roller, and a feed plate; wherein the at least two material support cylinders, the at least one feed roller, and the first and the second support plates are positioned between the pair of frame plates; and wherein the mechanism support cylinder passes through the first and the second support plates and is operably attached to the pair of oppositely facing frame plates on the support axis around which the at least two material support cylinders revolve.

In some embodiments, the brake system is configured to apply and release tension to wrapping material supported on the at least one material support cylinder, which comprises: a brake arm, a brake handle, a spring, a counter wheel, and a brake pad; wherein the brake system operates in at least a first and a second operable position; wherein the first operable position of the brake system prevents wrapping material supported on the at least one material support cylinder from rotating about the support axis; wherein the second operable position of the brake system allows wrapping material supported on the at least one material support cylinder to rotate about the support axis; wherein the brake handle has at least a first and a second operable position; wherein the first operable position of the brake handle causes the brake system to be operably connected with the material support cylinders, such that the material support cylinders are prevented from rotating about the support axis; and wherein the second operable position of the brake handle causes the brake system to be positioned such that the material support cylinders are allowed to rotate around the support axis.

In some embodiments, the wrapping mechanism comprises a lock mechanism comprising: a lock gear operably connected to the mechanism support cylinder, and rotatable with the first and second support plate about the support axis; and a lock pin that is movable between at least a first and a second operable position; wherein the first operable position of the lock pin prevents the lock gear, the mechanism support cylinder, and the first and second support plates from rotating around the support axis; and wherein the second operable position of the lock pin allows the lock gear, the mechanism support cylinder, and the first and second support plates to rotate around the support axis.

In some embodiments, the at least two material support cylinders which are adapted to mount a roll of wrapping material around their axes; wherein at least one of their plurality of radial positions, the roll of wrapping material is capable of rotation thereby allowing wrapping material to dispense from the roll of wrapping material through the feed roller and the feed plate; wherein the brake system in a first operable position prevents the rotation of the material support cylinders around the support axis; wherein the lock mechanism in a first operable position prevents the rotation of the mechanism support cylinder and the first and second support plates around the support axis; and wherein the brake system in a second operable position and the lock mechanism in a second operable position allows for the rotation of the material support cylinders, the mechanism support cylinder, and the first and second support plates around the support axis.

The present disclosure also relates to a harvester comprising: at least one bale chamber; a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve; at least one drive mechanism operably connected to at least the first support plate such that the movement of the drive mechanism drives the revolution of the at least two material support cylinders from a first position to one or more radial positions around the support axis; and, optionally, an access cover that permits accessibility of the wrapping mechanism from a point external to the harvester; wherein the at least two material support cylinders are operably attached to at least the first support plate; wherein the at least two material support cylinders are configured for the support of wrapping material; and wherein at least one position of at least one material support cylinder is configured for the dispensing of wrapping material into a bale chamber of the harvester.

In some embodiments, the at least two material support cylinders comprising a first end operably connected to the first support plate by a pivoting element; and a second end operably contacted with the second support plate in at least one notch and with a lever plate positioned around the opening of the at least one notch such that the lever plate prevents pivoting motion of the material support cylinder in its first operable condition; wherein the pivoting element is configured to pivot the second end of a respective material support cylinder away from the second support plate when the lever plate moves away from the opening of the at least one notch.

In some embodiments, the harvester comprises a pair of oppositely facing frame plates, a brake system, a lock mechanism, at least one feed roller, and a feed plate; wherein the at least two material support cylinders, the at least one feed roller, and the first and the second support plates are positioned between the pair of frame plates; and wherein the mechanism support cylinder passes through the first and the second support plates and is operably attached to the pair of oppositely facing frame plates on the support axis around which the at least two material support cylinders revolve.

In some embodiments, the brake system is configured to apply and release tension to wrapping material supported on the at least one material support cylinder, which comprises: a brake arm, a brake handle, a spring, a counter wheel, and a brake pad; wherein the brake system operates in at least a first and a second operable position; wherein the first operable position of the brake system prevents wrapping material supported on the at least one material support cylinder from rotating about the support axis; wherein the second operable position of the brake system allows wrapping material supported on the at least one material support cylinder to rotate about the support axis; wherein the brake handle has at least a first and a second operable position; wherein the first operable position of the brake handle causes the brake system to be operably connected with the material support cylinders, such that the material support cylinders are prevented from rotating about the support axis; and wherein the second operable position of the brake handle causes the brake system to be positioned such that the material support cylinders are allowed to rotate around the support axis.

In some embodiments, the lock mechanism comprises: a lock gear operably connected to the mechanism support cylinder, and rotatable with the first and second support plate about the support axis; and a lock pin that is movable between at least a first and a second operable position; wherein the first operable position of the lock pin prevents the lock gear, the mechanism support cylinder, and the first and second support plates from rotating around the support axis; and wherein the second operable position of the lock pin allows the lock gear, the mechanism support cylinder, and the first and second support plates to rotate around the support axis.

In some embodiments, the disclosure relates to a harvester comprising at least two material support cylinders which are adapted to mount a roll of wrapping material around their axes; wherein at least one of their plurality of radial positions, the roll of wrapping material is capable of rotation thereby allowing wrapping material to dispense from the roll of wrapping material through the feed roller and the feed plate; wherein the brake system in a first operable position prevents the rotation of the material support cylinders around the support axis; wherein the lock mechanism in a first operable position prevents the rotation of the mechanism support cylinder and the first and second support plates around the support axis; and wherein the brake system in a second operable position and the lock mechanism in a second operable position allows for the rotation of the material support cylinders, the mechanism support cylinder, and the first and second support plates around the support axis.

The disclosure also relates to methods for installing rolls of wrapping material into a harvester comprising: (a) moving the brake system to its second operable position; (b) moving the lever plate from its first operable position over the opening of the at least one notch with the wrapping material to a second operable position exposing the opening of the at least one notch; (c) pivoting at least one material support cylinder away from its axis; (d) mounting a roll of wrapping material over the at least one material support cylinder; (e) pivoting the roll of wrapping material and at least one material support cylinder back to its axis; (f) moving the lever plate its first operable position; (g) moving the lock pin to its second operable position; (h) activating the at least one drive mechanism to revolve the at least two support plates from a first position to the next radial position; (i) repeating steps (b) through (f); (j) repeating steps (h) and (i) as desired; (k) moving the lock pin to its first operable position; (l) moving the brake system to its first operable position.

BRIEF DESCRIPTION OF THE DRAWINGS

FIGS. 3A-3I depicts a representative embodiment of a multi-cylinder wrapping mechanism in various stages of operation.

DETAILED DESCRIPTION

Figure 1:
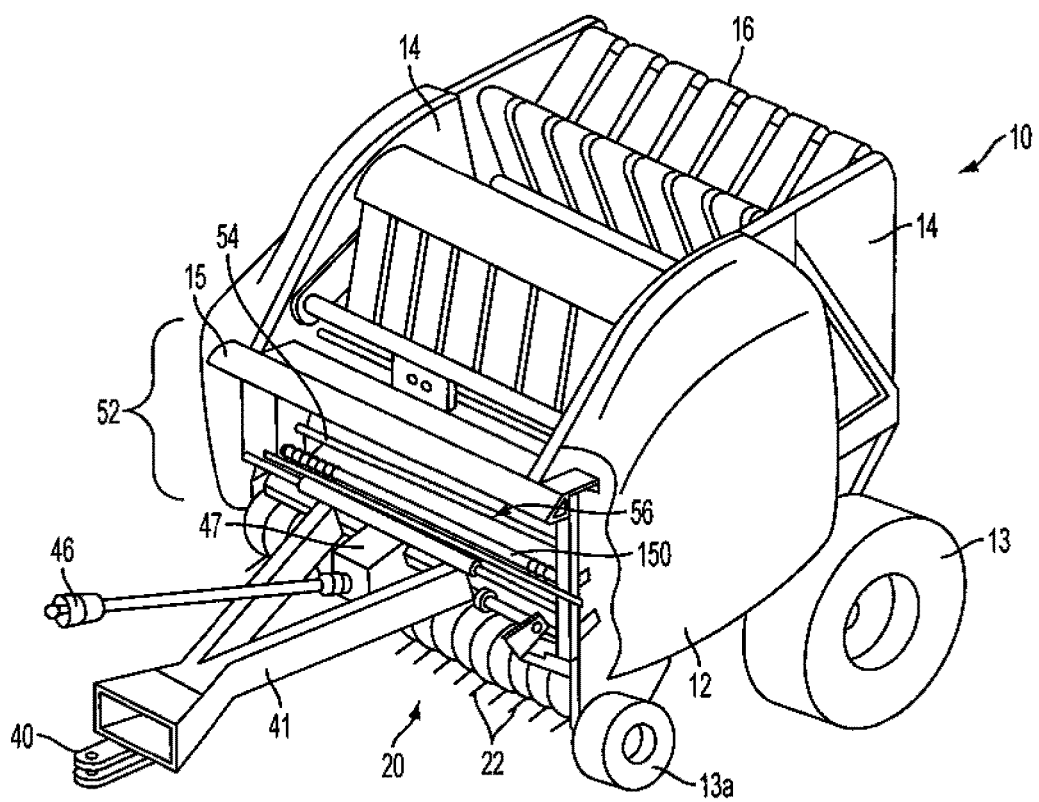
FIG. 1 depicts a representative static image of a traditional baler according to an embodiment.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The term "harvester" as used herein is defined as a machine designed to consolidate and package material so as to facilitate the storage and handling of the material for later use. In some embodiments, the harvester is used to harvest agricultural material. In some embodiments, the harvester is known as an agricultural baler, a waste baler, or a combine.

The term "material" as used herein is defined as a numerous individual items that are harvested or collected by the harvester. In some embodiments, the material is agricultural crop, such as hay or cotton. In some embodiments, the material is biomass.

The term "harvesting assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683 A1 that illustrates such mechanisms, the disclosures of which are incorporated herein by reference in their entirety.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in its fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is defined by the position of one or more baling belts that wrap around a top portion of the crop material as its rotating in the bale chamber. In some embodiments, the baling belts are mounted on a series of rolls positioned above the bale chamber that exact tension on the bale as it grows.

The term "wrapping mechanism" as used herein is defined as a mechanical device or assembly that uses wrapping material to wrap a formed bale. In some embodiments, the net wrapping mechanism comprises at least two material support cylinders, a mechanism support cylinder, a first and a second support plate, at least one drive mechanism, a pair of oppositely facing frame plates, a lock mechanism, a brake system, at least one feed roller, and a feed plate. In some embodiments, the material support cylinders, mechanism support cylinder, and the first and second support plate can revolve around a support axis. In some embodiments, wrapping material is passed around the at least one feed roller through the feed plate. In some embodiments, the wrapping mechanism is positioned within the interior of a harvester.

The term "wrapping material" as used herein is defined as a net, mesh, twine, plastic film, or other material that is used for the wrapping of a bale in order to maintain the shape and density of said bale and optionally protect it from weather or other external conditions.

The term "material support cylinder" as used herein is defined as a rod or tube configured for supporting a roll of wrapping material. In some embodiments, the roll of wrapping material is capable of rotating about the material support cylinder on the material support cylinder axis.

The term "mechanism support cylinder" as used herein is defined as a rod or tube configured for supporting elements of the wrapping mechanism. In some embodiments, the mechanism support cylinder supports a first and a second support plate, at least two material support cylinders, and optionally, at least two rolls of wrapping material mounted on the at least two material support cylinders. In some embodiments, the mechanism support cylinder rotates about a support axis.

The term "support plate" as used herein is defined as a notched, drilled or solid plate that is configured for the support of a material support cylinder. In some embodiments, the wrapping mechanism contains a first and a second support plate. In some embodiments, the first and the second support plate are operably attached to a mechanism support cylinder. In some embodiments, the first and the second support plate rotate around the support axis in a plurality of positions.

The term "support axis" as used herein is defined as a linear axis around which elements of the wrapping mechanism rotate. In some embodiments, at least two material support cylinders, at least two support plates, and a mechanism support cylinder rotate around the support axis. In some embodiments, the mechanism support cylinder is positioned on the support axis.

The term "drive mechanism" as used herein is defined as a device, assembly, or mechanism that facilitates the rotation and/or revolution of a support plate around the support axis. In some embodiments, the drive mechanism is a motor and/or mechanical drive device that facilitates the rotation and/or revolution of a support plate around the support axis. In some embodiments, the drive mechanism is a handle or type of gripping and/or assisting device that assists an operator in the manual revolution of a support plate around the support axis. In some embodiments, the drive mechanism drives the revolution of at least two material support cylinders around the support axis. In some embodiments, the drive mechanism drives the rotation of a first and a second support plate and a mechanism support cylinder around the support axis. In some embodiments, the drive mechanism is operated by and in electronic communication with a controller.

The term "brake system" as used herein is defined as a device or assembly that prevents the revolution of a roll of wrapping material around the support axis. In some embodiments the brake system is configured to apply and release variable tension to a roll of wrapping material supported on a material support cylinder, and controls the rate at which wrapping material is dispensed from a roll of wrapping material. In some embodiments, the brake system comprises a brake arm, a brake handle, a spring, a counter wheel, and a brake pad. In some embodiments, the brake system does not comprise an actuator for the movement of the brake pad. In some embodiments, the brake system does not comprise an actuator for the movement of any component of the brake system. In some embodiments, the brake system can be moved to a position where it does not prevent the revolution of a roll of wrapping material around the support axis.

Braking systems are known in the agricultural industry. Reference is made, for example, to U.S. Pat. No. 6,651,408 that illustrates such a system, the disclosures of which are incorporated herein by reference in their entirety. While the primary purpose of such a system is to control the rate at which wrapping material is dispensed from a roll of wrapping material during the wrapping process, such systems are also static and incapable of moving to a position where it would not obstruct the revolution of the material support cylinders. Embodiments of the present invention require a brake system that is capable of both controlling the rate at which wrapping material is removed from a roll of wrapping material and moving to a position where the system will not obstruct the revolution of the material support cylinders during the indexing process.

The term "lock mechanism" as used herein is defined as a device or assembly that mechanically prevents the rotation of the mechanism support cylinder around the support axis. In some embodiments, the lock mechanism comprises a lock gear and a lock pin, wherein the lock pin may pass through a plurality of holes in the lock gear. In some embodiments, the lock gear is operably connected to a mechanism support cylinder. In some embodiments, the lock gear and mechanism support cylinder are rotatable about a support axis. In some embodiments, the lock gear is positioned between a support plate and frame plate, wherein the frame plate has one hole through which a lock pin may pass. In some embodiments, the lock pin passes through the one hole in the frame plate, and also through at least one hole in the lock gear, whereby preventing the lock gear from rotating about a support axis.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine.

The present disclosure relates to a wrapping mechanism comprising: at least two material support cylinders, extending between a first and a second support plate and in operable contact with at least one of the first and second support plates, the at least two material support cylinders rotatably mounted around a support axis; a mechanism support cylinder operably connected to the first and second support plates and positioned on the support axis between the first and the second support plates around which the at least two material support cylinders revolve; and at least one drive mechanism operably connected to at least the first support plate such that the movement of the drive mechanism drives the revolution of the at least two material support cylinders from a first position to one or more radial positions around the support axis; wherein the at least two material support cylinders are operably attached to at least the first support plate; wherein the at least two material support cylinders are configured for the support of wrapping material; and wherein at least one position of at least one material support cylinder is configured for the dispensing of wrapping material.

FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale core. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would spin around a material support cylinder 150 as wrapping material is fed into a feeding entry 56.

Figure 2:
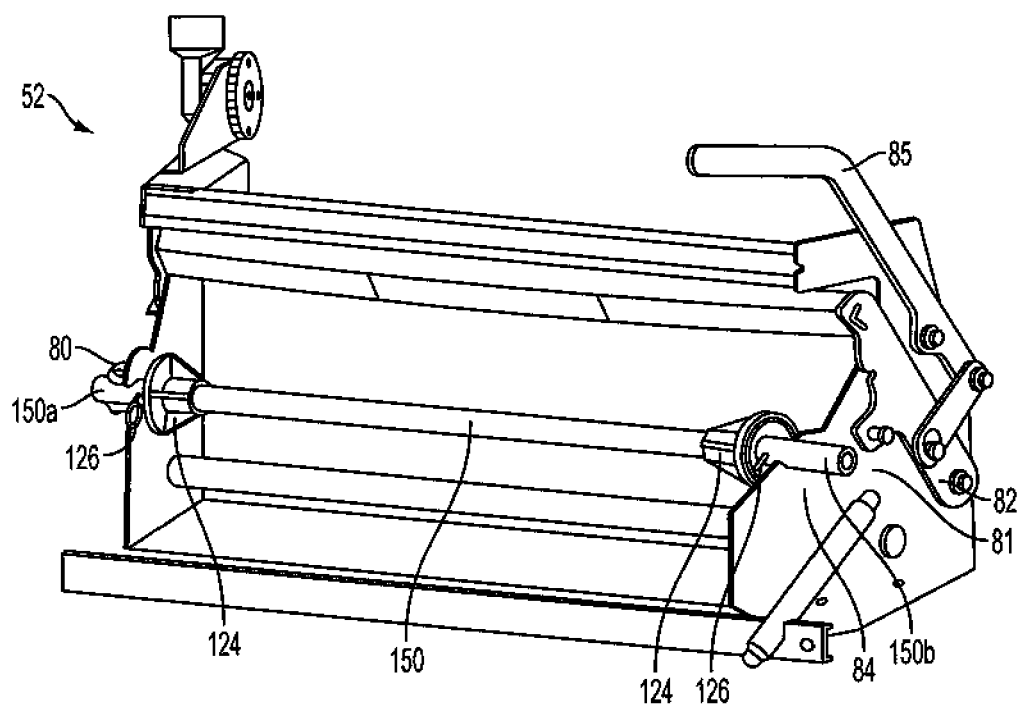
FIG. 2 depicts a diagram of a representative traditional wrapping device according to an embodiment.

FIG. 2 depicts a front facing view of a material support cylinder 150 in a traditional wrapping assembly 52. The single material support cylinder 150 is capable of rotating towards and away from the wrapping assembly 52 by pivot connection 80 for the conventional installation of a wrapping material roll. The first end 150a of the material support cylinder 150 is connected to the pivot connection 80 and the other facing the arm lock connection 81. One some material support cylinders, guides 126 are placed along the cone base of the bearing, so that the bearing is forced flush against the guide when the bearing is installed into the opening of a roll of wrapping material. Some material support cylinders contain holes running linearly from the end of the support tube to the center. These often serve as connection points to place the guide 126 either closer or further from the center of the material support cylinder to enclose various sized (e.g. length) rolls of wrapping material.

FIGS. 3A-3I depict the function of the components of an exemplary multi-cylinder, indexing wrapping mechanism during operation. It is understood that the components of the wrapping mechanism may function in a serial, stepwise or simultaneous fashion but that all steps described in FIGS. 3A, 3B, 3C, 3D, 3E, 3F, 3G, 3H, and 3I illustrate one embodiment of a single cycle of installing multiple rolls of wrapping material for purposes of the invention.

Figure 3A:
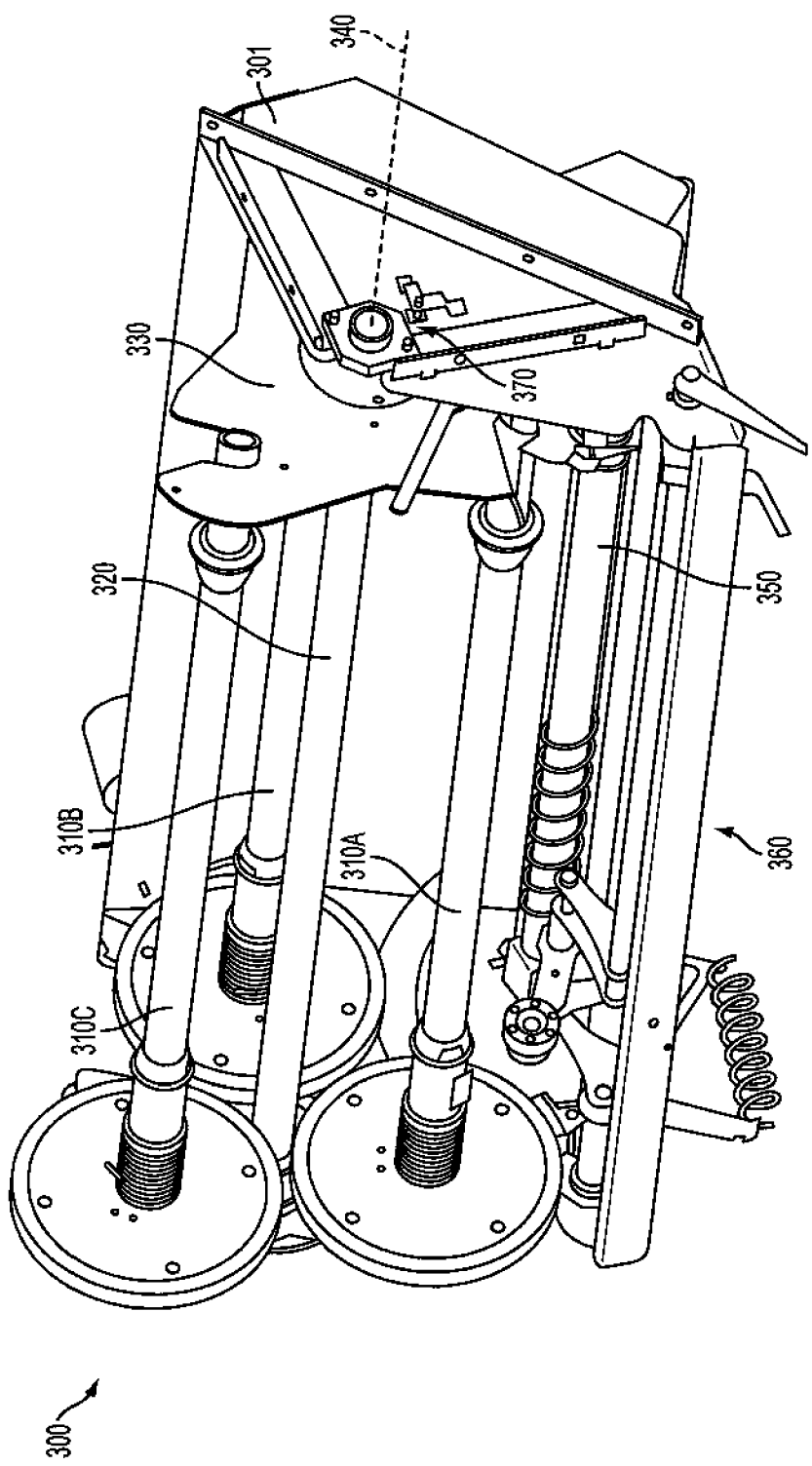

FIG. 3A depicts a wrapping mechanism, generally designated 300, that contains no rolls of wrapping material. A pair of frame plates, of which only one 301 is clearly visible, contain or support many of the elements of the wrapping mechanism, including three material support cylinders 310A, 310B and 310C, one mechanism support cylinder 320, and two support plates, of which only one 330 is clearly visible. The material support cylinders 310A, 310B, and 310C, the mechanism support cylinder 320, and the support plates 330 are all rotatable around a support axis 340. Other elements of the wrapping mechanism 300 include a feed roller 350, a brake system, generally designated 360, and a lock mechanism, generally designated 370. In this embodiment, the brake system 360 and lock mechanism 370 are shown in their first operable positions, which generally prevent the release of any material support cylinder or the rotation of any element around the support axis 340.

FIG. 3B depicts the wrapping mechanism 300 where the brake system 360 has been moved to a second operable position that allows the release and rotation of a material support cylinder 310. The brake system 360 is attached to both frame plates, of only one 301 is easily visible, and comprises a brake arm 361, a brake handle 362, a spring 363, a counter wheel 364, and a brake pad (not shown). Pulling the brake handle 362 moves the rest of the brake system 360 to the second operable position, and also releases the lever plate 312 that holds the material support cylinder 310 in the support plate 330.

Figure 3C:
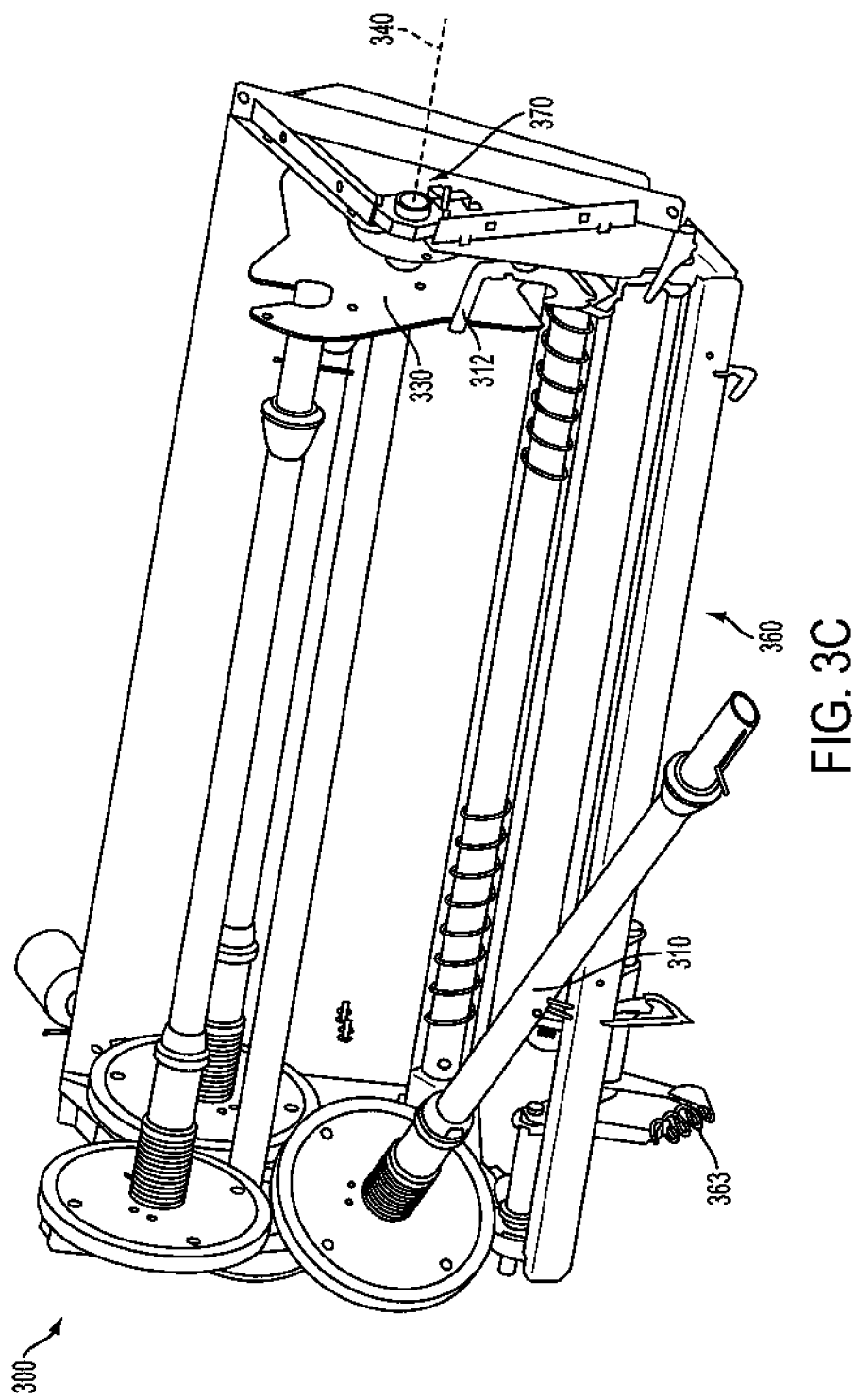

FIG. 3C depicts the wrapping mechanism 300 where a material support cylinder 310 is pivoted away from one of the support plates 330. With the brake system 360 in its second operable position, the lever plate 312 can be pulled to release the material support cylinder, which is still connected to the far support plate by a pivoting element (not shown). In this position, the support plates 330 cannot rotate around the support axis 340 because the lock mechanism 370 is in its first operable position.

FIG. 3d depicts the wrapping mechanism 300 where a material support cylinder 310 is pivoted away from one of the support plates 330, and a roll of wrapping material 314 has been placed on the material support cylinder 310. The brake system 360 is still in its second operable position, but the support plates 330 cannot rotate around the support axis 340 because the lock mechanism 370 is in its first operable position.

Figure 3E:
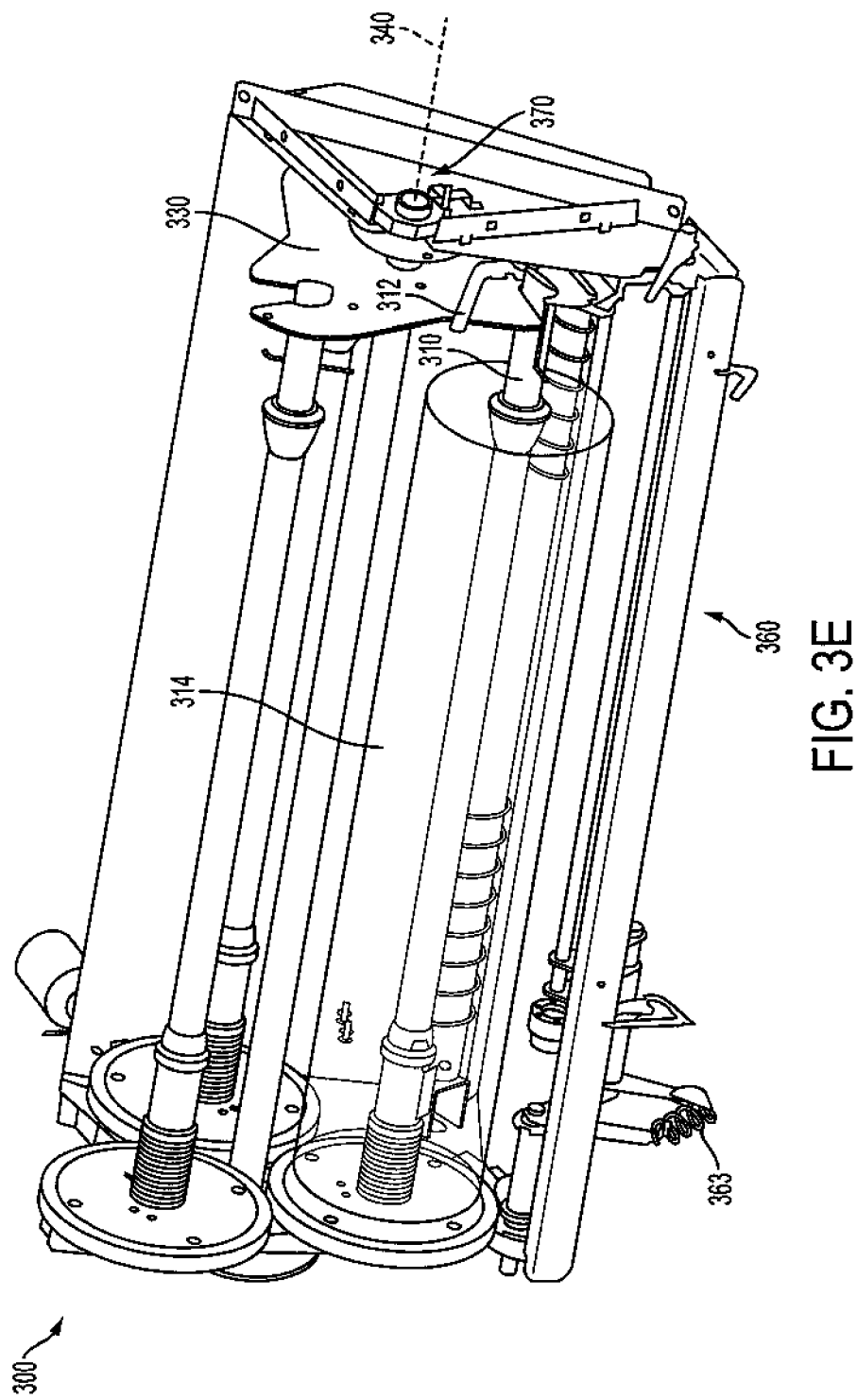

FIG. 3E depicts the wrapping mechanism 300 where a material support cylinder 310, supporting a roll of wrapping material 314, has been returned to its operable position in contact with both support plates 330 (only one of which is clearly shown). The lever plate 312 securely holds the material support cylinder 310. The brake system 360 is still in its second operable position, but the support plates 330 cannot rotate around the support axis 340 because the lock mechanism 370 is in its first operable position.

Figure 3F:
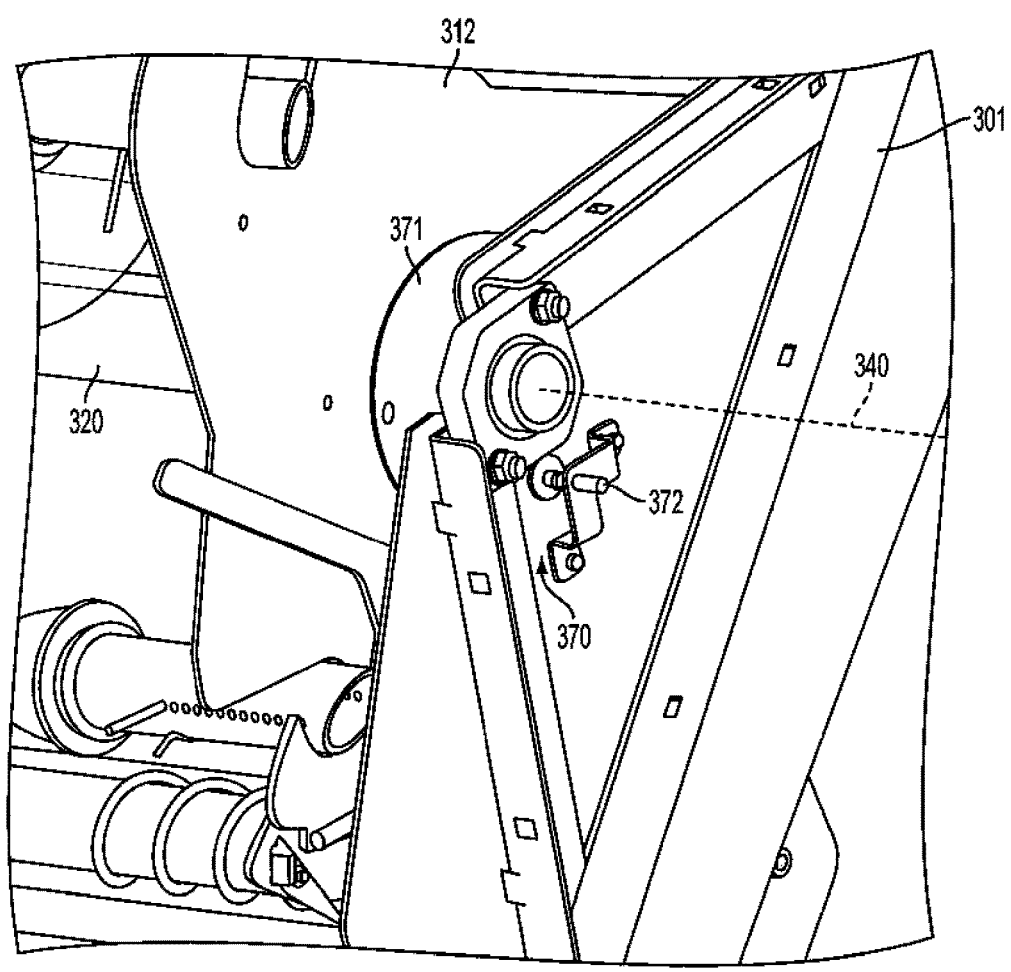

FIG. 3F depicts a close-up of the lock mechanism 370. The support cylinder 320 is operably connected to and supported by a frame plate 301. Operably attached to the mechanism support cylinder 320 is the second support plate 330 and the lock gear 371. Mounted directly to the frame plate 301 is the lock pin 372. In its first operable position, the lock pin 372 is positioned through a hole in the frame plate 301 and also through one of a plurality of holes in the lock gear 371. In its second operable position, the lock pin 372 is positioned so that it no longer passes though the lock gear 371, allowing the support cylinder to rotate around the support axis 340.

Figure 3G:
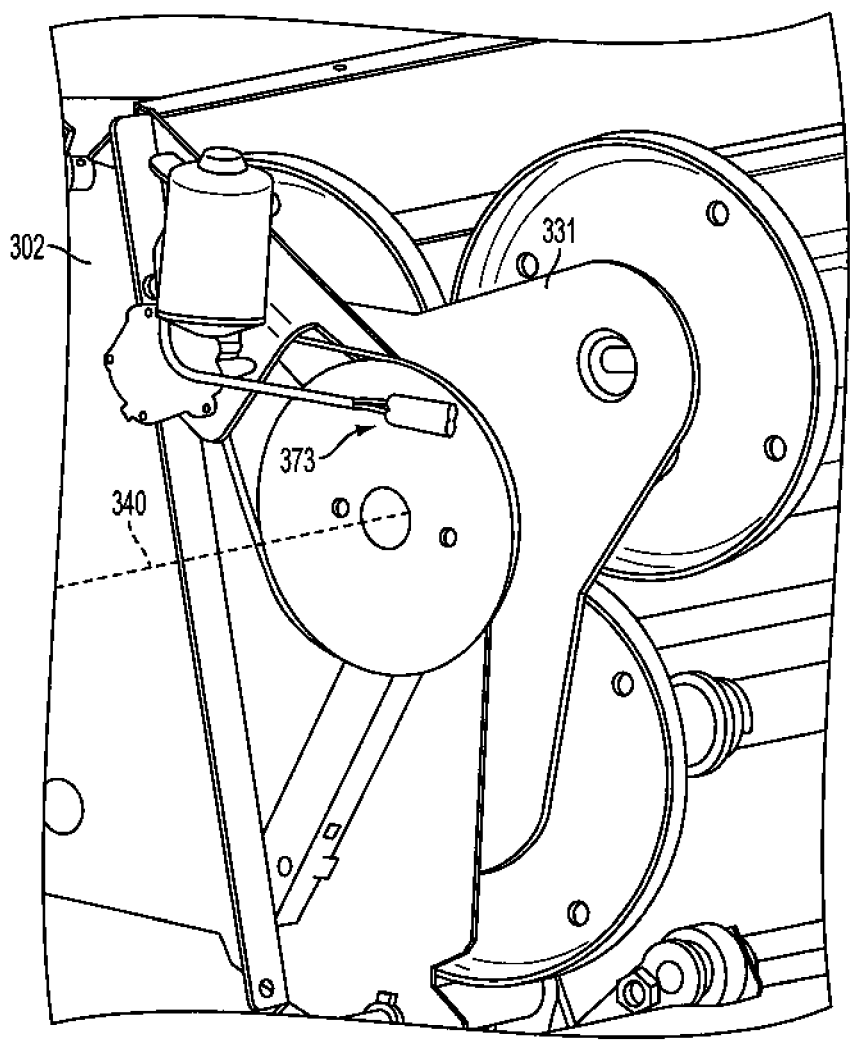
Figure 31:
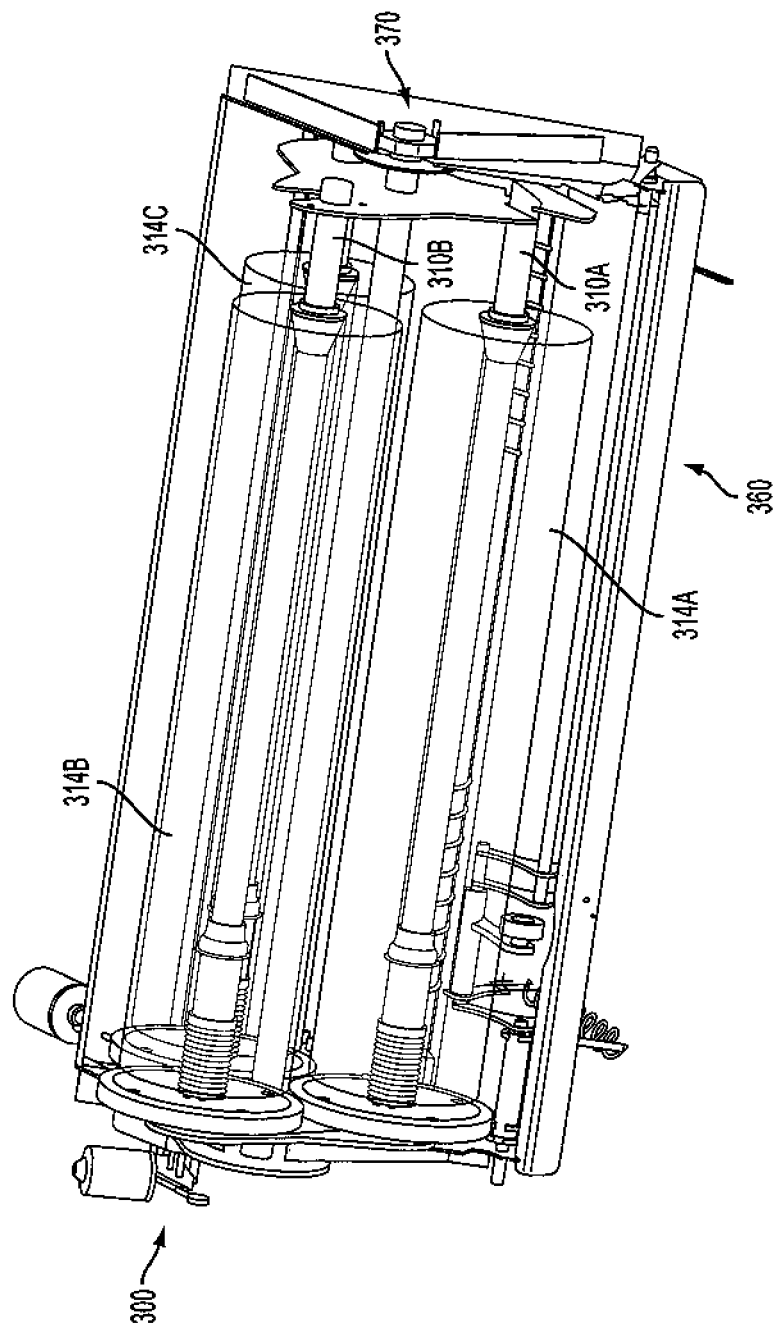

FIG. 3G depicts a close-up of the drive mechanism, generally designated 373. The mechanism support cylinder 320 passes through a frame plate 302 and is operably connected to the drive mechanism 373. When activated, the drive mechanism 373 rotates the mechanism support cylinder 320 around the support axis 340. This assumes the lock mechanism (generally 370 but not shown in this embodiment) is in its second operable position (see FIG. 3F). Also shown is the first support plate 331.

FIG. 3H depicts the wrapping mechanism 300 where a material support cylinder 310a, supporting a roll of wrapping material 314, has been rotated to a second position, while an empty material support cylinder 310b has been rotated to the first operable position. around the support axis 340. The brake system 360 is still in its second operable position, so the lever plate 312 may be pulled to release the empty material support cylinder 310b from the second support plate 330. The lock mechanism 370, is returned to its first operable position, so the mechanism support cylinder 320 cannot rotate around the support axis 340. To load a new roll of wrapping material (not shown) on the empty material support cylinder 310b, the steps generally depicted in FIGS. 3C 3G should be followed.

FIG. 3I depicts the wrapping mechanism 300 where all three material support cylinders 310a, 310b, and 310c are supporting rolls of wrapping material 314a, 314b, and 314c. The brake system 360 and the lock mechanism 370 are in their first operable positions.

Figure 4A:
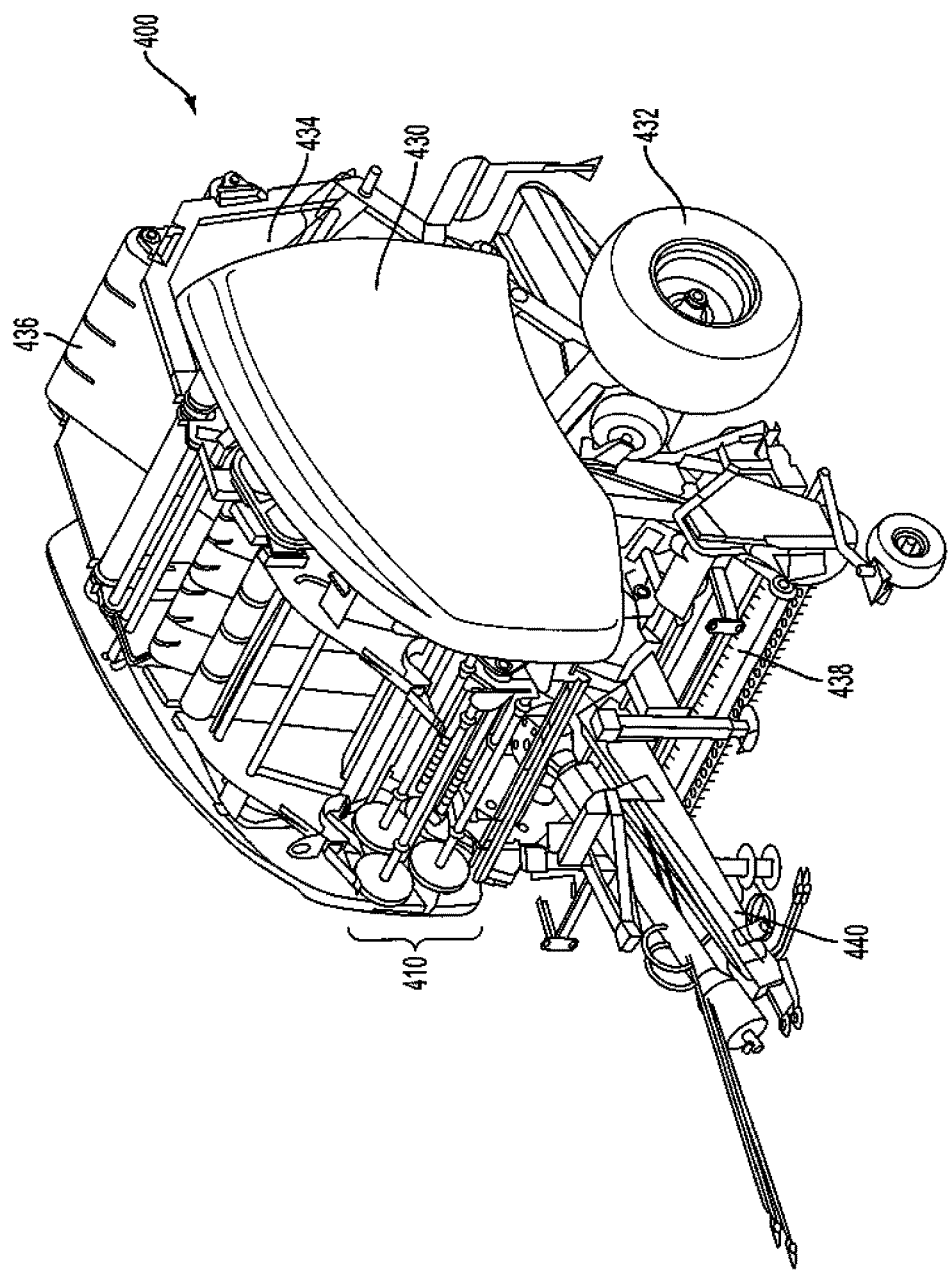
FIGS. 4A and 4B depict representative static images of an exemplary baler containing the multi-cylinder wrapping mechanism.
Figure 4B:
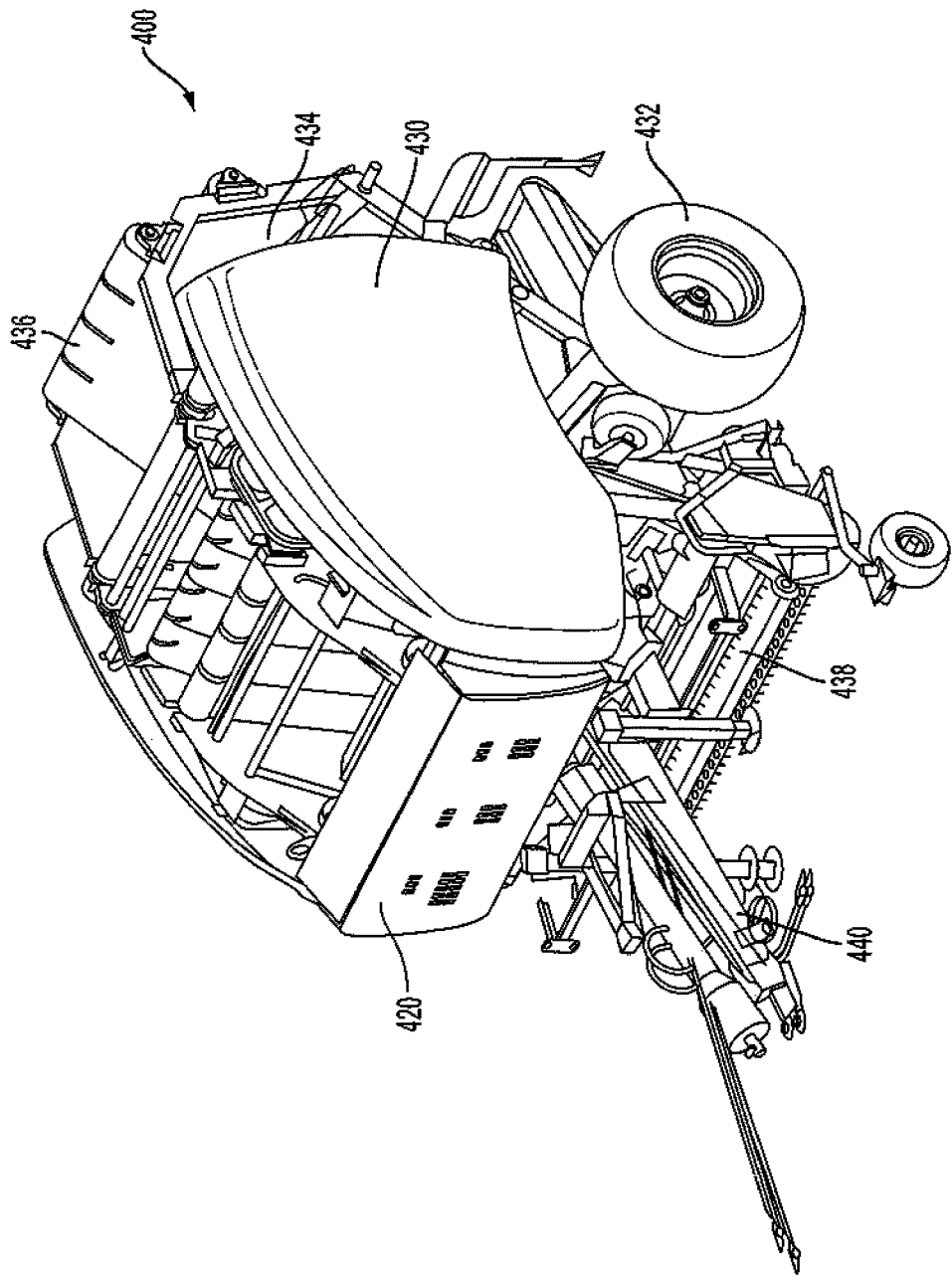

FIGS. 4A and 4B depict a static image of an exemplary round baler, generally designated 400, containing the multi-cylinder wrapping mechanism generally described in FIGS. 3A-3I. The exemplary round baler 400, similar to the round baler described in FIG. 1, comprises a main frame 430 supported by a pair of rear wheels 432, a pair of sidewalls 434, a plurality of bailing belts 436, a pickup mechanism 438, and a forwardly mounted hitch 440. In FIG. 4A, the exemplary round baler 400 also contains the wrapping mechanism, generally designated 410, in the forward section of the baler. In FIG. 4B, the exemplary round baler 400 is shown with an exterior access panel 420 covering the wrapping mechanism 410.

In some embodiments, the harvester and systems disclosed herein comprise a controller that operates and is in electronic communication with, the drive mechanism.

In some embodiments, the harvester and systems disclosed herein comprise at least one sensors at or proximate to a spring of a brake system. This disclosure relates to the contents of U.S. Patent Application filed Apr. 18, 2014, invented by Scott Simmons entitled INDEXING WRAPPING SYSTEM AND SUPPORTING SYSTEMS, which is incorporated by reference in its entirety.

Having described a series of embodiments, it will become apparent that various modifications can be made without departing from the scope of the invention as defined in the accompanying claims. Various publications, including patents, published applications, technical articles and scholarly articles are cited throughout the specification. Each of these cited publications is incorporated by reference herein, in its entirety.

What is claimed is:

1. A wrapping mechanism comprising:
at least two material support cylinders, extending between a first and a second support plate and in operable contact with at least one of the first and second support plates, the at least two material support cylinders rotatably mounted around a support axis;
a mechanism support cylinder operably connected to the first and second support plates and positioned on the support axis between the first and the second support plates around which the at least two material support cylinders revolve in a plurality of radial positions;
at least one drive mechanism operably connected to at least the first support plate such that the drive mechanism facilitates revolution of the at least two material support cylinders from a first radial position to one of the plurality of radial positions around the support axis;
a pair of oppositely facing frame plates;
a brake system;
a lock mechanism;
at least one feed roller; and
a feed plate;
wherein the at least one radial position allows wrapping material to dispense from the roll of wrapping material through the feed roller and the feed plate;
wherein the at least two material support cylinders are operably attached to at least the first support plate;
wherein the at least two material support cylinders are configured for supporting rolls of wrapping material, and/or loading or unloading a roll of wrapping material at the first radial position around the support axis; and
wherein at least one radial position of at least one material support cylinder is configured for dispensing wrapping material;
wherein the brake system comprises: a brake arm, a brake handle, a spring, a counter wheel, and a brake pad; wherein the brake system is configured to prevent and/or allow the dispensing of wrapping material supported on the at least one material support cylinder; and wherein the brake system is configured to control the speed of rotation of a roll of wrapping material supported on the at least one material support cylinder;
wherein the brake system operates in at least a first and a second operable position, the first operable position of the brake system prevents the revolution of the wrapping material supported on the at least one material support cylinder about the support axis, and the second operable position of the brake system allows the revolution of the wrapping material supported on the at least one material support cylinder about the support axis;
wherein the brake handle has at least a first and a second operable position that toggles the brake system between its first and second operable positions.

2. The wrapping mechanism of claim 1, wherein the second support plate comprises at least one notch positioned at an edge of the second support plate, configured to receive the at least two material support cylinders; wherein a lever plate is positioned around an opening of the at least one notch, the lever plate being movable toward and away from the opening, the lever plate preventing pivoting motion of the at least two material support cylinders in a first operable condition; wherein the at least two material support cylinders comprise: (i) a first end operably connected to the first support plate by a pivot connection and (ii) a second end in operable contact with the second support plate at a position in the at least one notch; and wherein the pivot connection is configured to pivot the second end of a respective material support cylinder away from the second support plate when the lever plate moves away from the opening of the at least one notch.

3. The wrapping mechanism of claim 1, wherein the at least two material support cylinders, the at least one feed roller, and the first and the second support plates are positioned between the pair of frame plates; wherein the mechanism support cylinder passes through the first and the second support plates and is operably attached to the pair of oppositely facing frame plates on the support axis around which the at least two material support cylinders revolve.

4. The wrapping mechanism of claim 1, wherein the lock mechanism comprises:
   a lock gear operably connected to the mechanism support cylinder, and rotatable with the first and second support plate about the support axis; and
   a lock pin that is movable between at least a first and a second operable position; wherein the first operable position of the lock pin prevents the lock gear, the mechanism support cylinder, and the first and second support plates from rotating around the support axis; and
   wherein the second operable position of the lock pin allows the lock gear, the mechanism support cylinder, and the first and second support plates to rotate around the support axis.

5. The wrapping mechanism of claim 1,
   wherein the brake system prevents the revolution of the material support cylinders around the support axis in a first operable position;
   wherein the lock mechanism prevents the rotation of the mechanism support cylinder and the first and second support plates around the support axis in a first operable position; and
   when the brake system and the lock mechanism are disengaged in their second operable positions the material support cylinders are capable of revolution around the support axis, and the mechanism support cylinder and the first and second support plates are capable of rotation around the support axis.

6. A harvester comprising:
   at least one bale chamber;
   a wrapping mechanism comprising:
   at least two material support cylinders, extending between a first and a second support plate and in operable contact with at least one of the first and second support plates, the at least two material support cylinders rotatably mounted around a support axis;
   a mechanism support cylinder operably connected to the first and second support plates and positioned on the support axis between the first and the second support plates around which the at least two material support cylinders revolve;
   at least one drive mechanism operably connected to at least the first support plate such that the drive mechanism facilitates revolution of the at least two material support cylinders from a first position to one or more radial positions around the support axis;
   an access cover that permits accessibility of the wrapping mechanism from a point external to the harvester;
   a pair of oppositely facing frame plates;
   a brake system, configured to apply and release tension to wrapping material supported on the at least one material support cylinder, comprises: a brake arm, a brake handle, a spring, a counter wheel, and a brake pad;
   a lock mechanism;
   at least one feed roller; and
   a feed plate;
   wherein the at least two material support cylinders are operably attached to at least the first support plate;
   wherein the at least two material support cylinders are configured for supporting rolls of wrapping material, and/or loading or unloading a roll of wrapping material at a first radial position around the support axis; and
   wherein at least one position of the at least one material support cylinder is configured for the dispensing of wrapping material into a bale chamber of the harvester;
   wherein the brake system operates in at least a first and a second operable position; the first operable position of the brake system prevents wrapping material supported on the at least one material support cylinder from revolving about the support axis, and the second operable position of the brake system allows wrapping material supported on the at least one material support cylinder to revolve about the support axis;
   wherein the brake handle has at least a first and a second operable position that toggles the brake system between its first and second operable positions, wherein the first operable position of the brake handle causes the brake system to be operably connected with the material support cylinders, such that the material support cylinders are prevented from revolving about the support axis; and wherein the second operable position of the brake handle causes the brake system to be positioned such that the material support cylinders are allowed to revolve around the support axis.

7. The harvester of claim 6, wherein the second support plate comprises at least one notch positioned at an edge of the second support plate, configured to receive the at least two material support cylinders; wherein a lever plate is positioned around an opening of the at least one notch, the lever plate being movable toward and away from the opening, the lever plate preventing pivoting motion of the at least two material support cylinders in a first operable condition; wherein the at least two material support cylinders comprise: (i) a first end operably connected to the first support plate by a pivot connection and (ii) a second end in operable contact with the second support plate at a position in the at least one notch; and wherein the pivot connection is configured to pivot the second end of a respective material support cylinder away from the second support plate when the lever plate moves away from the opening of the at least one notch.

8. The harvester of claim 6, wherein the at least two material support cylinders, the at least one feed roller, and the first and the second support plates are positioned between the pair of frame plates; wherein the mechanism support cylinder passes through the first and the second support plates and is operably attached to the pair of oppositely facing frame plates on the support axis around which the at least two material support cylinders revolve.

9. The harvester of claim 6, wherein the lock mechanism comprises:
   a lock gear operably connected to the mechanism support cylinder, and rotatable with the first and second support plate about the support axis; and
   a lock pin that is movable between at least a first and a second operable position; wherein the first operable position of the lock pin prevents the lock gear, the mechanism support cylinder, and the first and second support plates from rotating around the support axis; and
   wherein the second operable position of the lock pin allows the lock gear, the mechanism support cylinder, and the first and second support plates to rotate around the support axis.

10. The harvester of claim 6, wherein the at least two material support cylinders are adapted to mount a roll of wrapping material around their axes; and, wherein at least one of their plurality of radial positions, the roll of wrapping material is capable of rotation thereby allowing wrapping material to dispense from the roll of wrapping material through the feed roller and the feed plate.

11. The harvester of claim 6,
wherein the brake system prevents the revolution of the material support cylinders around the support axis in a first operable position;
wherein the lock mechanism prevents the rotation of the mechanism support cylinder and the first and second support plates around the support axis in a first operable position; and, when the brake system and the lock mechanism are disengaged in their second operable positions, the material support cylinders are capable of revolution around the support axis, and the mechanism support cylinder and the first and second support plates are capable of rotation around the support axis.

* * * * *